(12) United States Patent
Magny et al.

(10) Patent No.: US 9,188,154 B2
(45) Date of Patent: Nov. 17, 2015

(54) ROLLING BEARING, NOTABLY USED IN A WIND TURBINE

(75) Inventors: Jean-Baptiste Magny, Migé (FR); Pascal Ovize, Chitry le Fort (FR); Jesko-Henning Tanke, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/007,288

(22) PCT Filed: Mar. 24, 2011

(86) PCT No.: PCT/EP2011/054557
§ 371 (c)(1),
(2), (4) Date: Feb. 18, 2014

(87) PCT Pub. No.: WO2012/126529
PCT Pub. Date: Sep. 27, 2012

(65) Prior Publication Data
US 2014/0199011 A1   Jul. 17, 2014

(51) Int. Cl.
*F16C 43/04*   (2006.01)
*F16C 33/76*   (2006.01)
(Continued)

(52) U.S. Cl.
CPC ............... *F16C 19/38* (2013.01); *F16C 19/40* (2013.01); *F16C 33/3706* (2013.01); *F16C 33/51* (2013.01); *F16C 33/58* (2013.01); *F16C 33/585* (2013.01); *F16C 33/66* (2013.01); *F16C 33/7823* (2013.01); *F16C 33/7836* (2013.01); *F16C 43/06* (2013.01); *F16J 15/3236* (2013.01); *F16C 33/6614* (2013.01); *F16C 33/6651* (2013.01); *F16C 2300/14* (2013.01); *F16C 2360/31* (2013.01)

(58) Field of Classification Search
CPC .......... F16C 19/38; F16C 19/40; F16C 33/51; F16C 33/58; F16C 33/7823; F16C 33/7826
USPC ........... 384/44, 447, 450, 477, 486, 489, 507, 384/508, 511, 551, 559, 565, 584, 619, 384/620; 277/353, 551, 566; 415/170.1
See application file for complete search history.

(56) References Cited

U.S. PATENT DOCUMENTS 3,275,391 A * 9/1966 Blais .............................. 384/447
3,948,578 A   4/1976 Martin
(Continued)

FOREIGN PATENT DOCUMENTS

DE   19534287 C1   8/1996
EP   0518763 A1   12/1992
(Continued)

OTHER PUBLICATIONS

Machine translation of JP 2000291668 A obtained on Jul. 25, 2014.*

*Primary Examiner* — Adam D Rogers
(74) *Attorney, Agent, or Firm* — Bryan Peckjian; SKF USA Inc. Patent Dept.

(57) ABSTRACT

A rolling bearing including an inner ring, an outer ring and at least one row of angular contact rollers disposed between raceways provided on the rings, each roller comprising a rolling surface in contact with said raceways and two opposite end faces. The inner and outer rings having guiding faces coming into contact with the end faces of the rollers.

14 Claims, 4 Drawing Sheets

Figure 1:
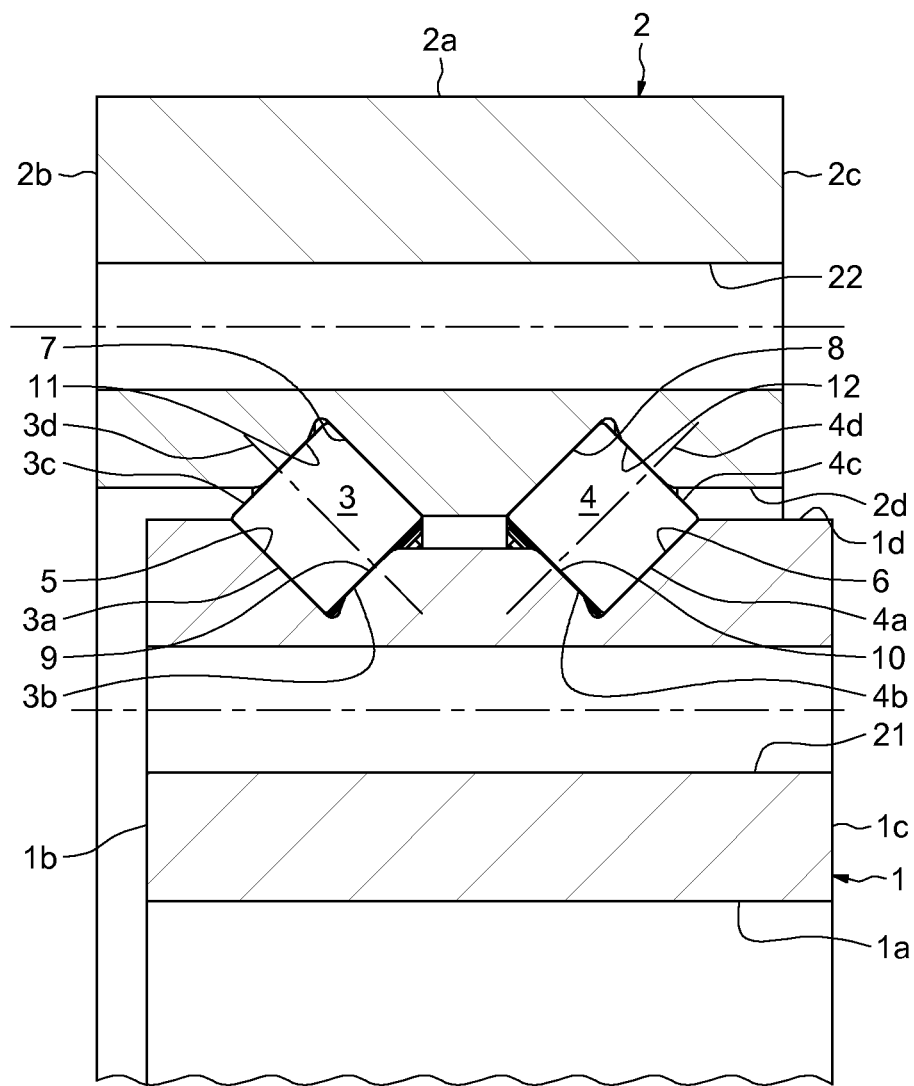

(51) Int. Cl.
*F16C 19/40* (2006.01)
*F16C 19/38* (2006.01)
*F16C 43/06* (2006.01)
*F16J 15/32* (2006.01)
*F16C 33/37* (2006.01)
*F16C 33/78* (2006.01)
*F16C 33/58* (2006.01)
*F16C 33/51* (2006.01)
*F16C 33/66* (2006.01)

(56) References Cited

U.S. PATENT DOCUMENTS

| | | | |
|---|---|---|---|
| 4,606,654 A * | 8/1986 | Yatsu et al. | 384/447 |
| 4,834,560 A * | 5/1989 | Jacob et al. | 384/461 |
| 4,906,113 A | 3/1990 | Sague | |
| 4,961,653 A * | 10/1990 | Suzuki et al. | 384/447 |
| 5,921,685 A * | 7/1999 | Ishimaru et al. | 384/564 |
| 8,282,353 B2 * | 10/2012 | Russ et al. | 416/131 |
| 8,579,511 B2 * | 11/2013 | Kikuchi | 384/447 |
| 2009/0175724 A1 | 7/2009 | Russ et al. | |
| 2014/0301684 A1 * | 10/2014 | Bouron et al. | 384/450 |

FOREIGN PATENT DOCUMENTS

| | | |
|---|---|---|
| JP | 2000291668 A * | 10/2000 |
| JP | 2000314418 A | 11/2000 |
| JP | 2002013540 A | 1/2002 |
| WO | WO 2008138281 A1 * | 11/2008 |
| WO | 2010043574 A1 | 4/2010 |
| WO | WO 2010127989 A1 * | 11/2010 |

* cited by examiner

ROLLING BEARING, NOTABLY USED IN A WIND TURBINE

The present invention relates to the field of rolling bearings, in particular rolling bearings having an inner ring and an outer ring with one or more rows of contact rollers therebetween.

The invention relates more particularly to a large-diameter rolling bearing adapted to be used in a wind turbine.

In such application, rolling bearings are used to angularly orient the rotor of the turbine according to the direction of the wind, and to orient the blades of the turbine around their longitudinal axes. Such rolling bearings are loaded both axially and radially, often with a relatively strong load.

U.S. Pat. No. 3,948,578 discloses a rolling bearing for a wind turbine comprising two concentric inner and outer rings, two rows of oblique contact rollers and two cages for maintaining the circumferential spacing of the rollers. Each row of rollers is located in an annular space defined between the rings, said space being delimited by two opposite raceways for the rollers and two non-loaded surfaces.

Under the action of the loads to which such a rolling bearing is subjected during operation of the wind turbine, the rollers of a row may slightly skew or tilt with respect to the raceways of the inner and outer rings. Accordingly, the service life of the rolling bearing reduces.

One aim of the present invention is to overcome this drawback.

It is a particular object of the present invention to provide a rolling bearing, notably adapted for a wind turbine, which is simple to manufacture, economic and having a good reliability.

A further object of the present invention is to provide a rolling bearing having good static and dynamic carrying capacities.

In one embodiment, the rolling bearing comprising an inner ring, an outer ring and at least one row of rollers disposed between raceways provided on the rings, each roller comprising a rolling surface in contact with said raceways and two opposite end faces. Guiding faces coming into contact with the end faces of the rollers are provided on the inner ring and the outer ring. The guiding faces may be disposed opposite with one another.

In one preferred embodiment, the ratio of the clearance between the guiding faces and the end faces of the rollers with respect to the length of said rollers is from 0.1% to 5%, and preferably from 0.5% to 0.9%.

Preferably, the guiding faces are formed directly on the inner ring and the outer ring.

In one embodiment, the guiding faces and the raceways of the rings are disposed perpendicular with respect to one another.

Preferably, the rotation axes of the rollers of the same row converge in one single point located on the longitudinal axis of the bearing.

The guiding faces are advantageously disposed parallel with one another. The guiding faces may extend radially relative to the rotation axes of the rollers.

Advantageously, the length of the guiding faces is smaller than the one of the raceways. Preferably, the guiding faces are straight. The entire length of the rolling surface of each roller may be in contact with the raceways of the rings.

In one embodiment, the rolling bearing further comprises spacers disposed circumferentially between the rollers. Each spacer may comprise two parallel cavities having the shape of the rollers and at least one hole inside which a lubricant is located and putting the two cavities into communication.

In one embodiment, the rolling surfaces of the rollers have a cylindrical profile. Alternatively, the rolling surfaces may have a spherical profile or a logarithmic profile.

Preferably, the rolling bearing comprises at least two rows of rollers, the rotation axes of the rollers of one row crossing the rotation axes of the rollers of the other row.

The rolling bearing may further comprises seals provided between the inner and outer rings and having in cross section the overall shape of a H, each of the seals comprising internal lips and external lips forming the two substantially parallel branches of said H. The inner and outer rings may comprise opposite radial ribs located axially between the internal and external lips of each seal.

In one embodiment, each of the inner and outer rings comprises one guiding face.

The rollers may have a rolling surface for rolling on the raceways with a cylindrical, or a spherical or a logarithmic profile.

In one embodiment, the rolling bearing further comprises plugs provided on the outer ring for closing filling orifices through which the rollers have been introduced during the assembly of the bearing.

The rolling bearing as previously defined may be particularly useful as a bearing for a wind turbine comprising a mast holding a nacelle where blades are installed, in particular for rotating the nacelle with respect to the mast and/or for rotating/pitching each blade around its longitudinal axis.

Figure 2:
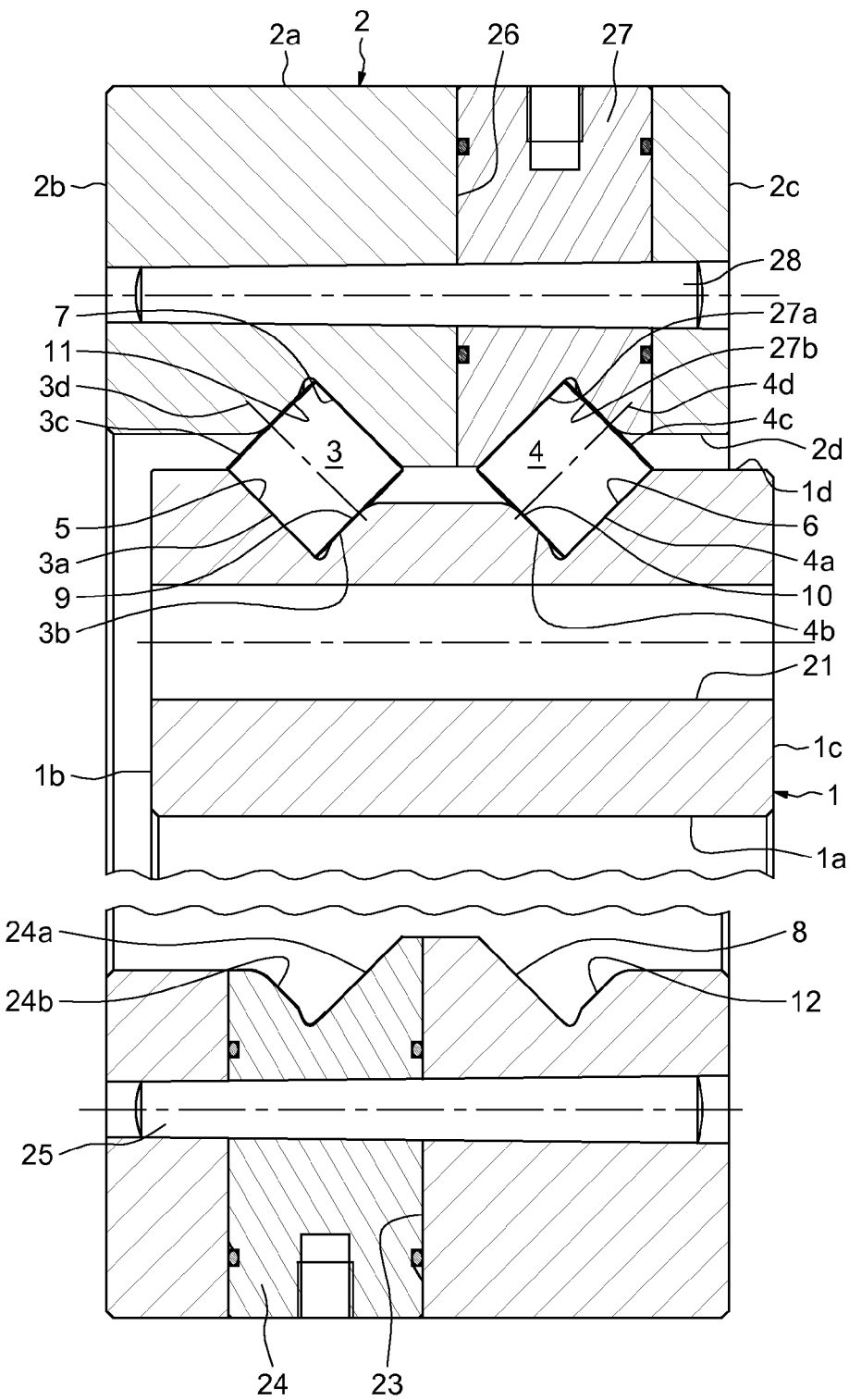
Figure 3:
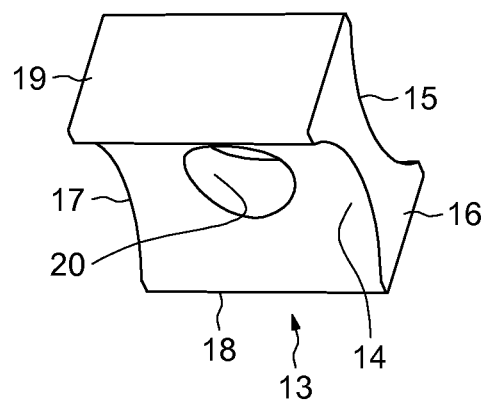
Figure 4:
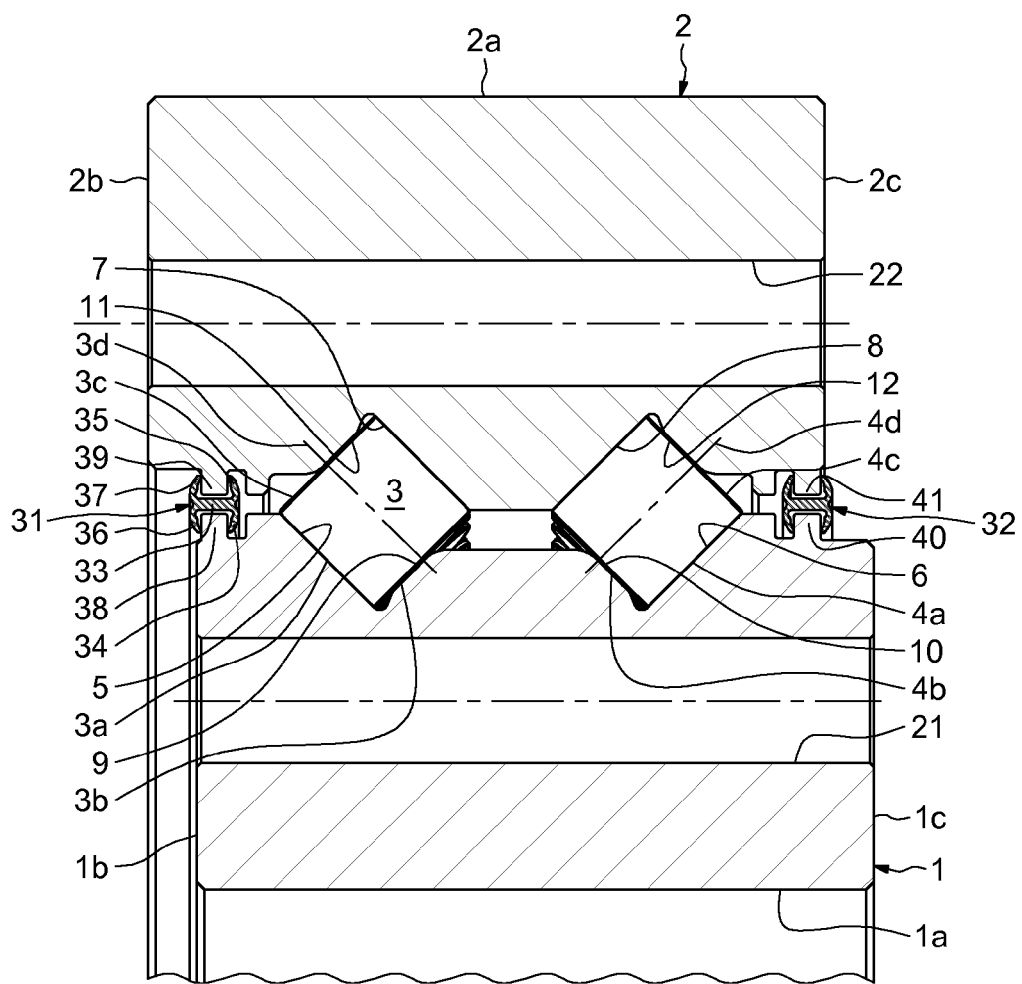

The present invention and its advantages will be better understood by studying the detailed description of specific embodiments given by way of non-limiting examples and illustrated by the appended drawings on which:

FIG. 1 is a half section of a rolling bearing according to a first example of the invention, FIG. 2 is a section of the rolling bearing of FIG. 1 according to another section plan, FIG. 3 is a perspective view of a spacer of the rolling bearing of FIGS. 1 and 2, and FIG. 4 is a half section of a rolling bearing according to a second example of the invention.

The rolling bearing as illustrated by FIG. 1 is a large-diameter rolling bearing comprising an inner ring 1 and an outer ring 2 between which are housed two rows of oblique or angular contact rollers 3 and 4. The inner and outer rings 1, 2 are concentric and extend axially along the bearing rotation axis (not shown) of the rolling bearing. The rings 1, 2 are of the solid type. A "solid ring" is to be understood as a ring obtained by machining with removal of material (by machining, grinding) from metal tube stock, bar stock, rough forgings and/or rolled blanks.

The rollers 3, 4 are identical with one another and each comprise an exterior rolling surface 3a, 4a and opposite end transverse faces 3b and 3c, 4b and 4c delimiting axially the rolling surface. In the illustrated embodiment, the rolling surfaces 3a, 4a have a cylindrical profile. Alternatively, the rolling surfaces may have a spherical profile or a logarithmic profile. For each row, the rotation axes 3d, 4d of the rollers converge in one single point located on the longitudinal axis of the bearing, and are disposed at a determined angle with respect to the bearing axis. In the illustrated embodiment, the rotation axes 3d, 4d of the rollers of the two rows are arranged at an angle of 90° to each other, and of approximately of 45° to the bearing axis. The angle between the rotation axis 3d, 4d of each roller and the bearing axis may be comprised for example between 20° and 70°.

The inner ring 1 has a bore 1a of cylindrical shape designed to be fixed to a chassis or to a structure of a machine (not shown) and delimited by opposite radial lateral surfaces 1b, 1c. The inner ring 1 also includes a stepped exterior cylindrical surface 1d onto which first and second annular raceways 5, 6 are formed. The raceways 5, 6 are mutually symmetric with respect to a transverse radial plane passing through the centre of the rolling bearing. Each raceway 5, 6 extend obliquely inwards from the exterior cylindrical surface 1d and has a frustoconical shape. Each raceway 5, 6 has in cross section a straight internal profile in contact with the rolling surfaces 3a, 4a of the rollers 3, 4.

The outer ring 2 comprises an outer cylindrical surface 2a delimited by opposite radial lateral surfaces 2b, 2c. The radial lateral surface 2c is axially set back from the corresponding radial surface 1c of the inner ring 1, whereas the radial lateral surface 1b of said inner ring is axially set back from the corresponding radial surface 2b of the outer ring. Alternatively, the radial lateral surfaces 2b and 1b, 2c and 1c of the inner and outer rings 1, 2 could be respectively coplanar.

The outer ring 2 also includes a stepped annular bore 2d of cylindrical shape into which first and second raceways 7, 8 are formed. The raceways 7, 8 are mutually symmetric with respect to the radial plane passing through the centre of the rolling bearing. The raceways 7, 8 are respectively parallel to the raceways 5, 6. Each raceway 7, 8 extends obliquely outwards from the bore 2d and has a frustoconical shape. Each raceway 7, 8 has in cross section a straight internal profile in contact with the rolling surfaces 3a, 4a of the rollers 3, 4.

The dimension of the raceways 5 to 8 is adapted such that the entire length of the rolling surfaces 3a, 4a of each roller is in contact with said raceways. Surfaces stresses on the raceways are reduced. The raceways 5, 6 of the inner ring and the raceways 7, 8 of the outer ring mutually face each other while at the same time being symmetric with regard to the rotation axis 3d, 4d of the rollers 3, 4.

The inner ring 1 also comprises annular guiding faces 9, 10 formed onto the exterior surface 1d and coming into axial contact with the end faces 3b, 4b of the rollers with regard to the rotation axes 3d, 4d. The guiding faces 9, 10 are mutually symmetric with respect to the radial plane passing through the centre of rolling bearing. Each guiding face 9, 10 is straight and disposed perpendicular to the corresponding raceway 5, 6 and is connected to the edge of small diameter of said raceway by a concave fillet. Each guiding face 9, 10 extends obliquely outwards from said fillet and is connected to the exterior surface 1d of the inner ring. The guiding faces 9, 10 extend radially relative to the rotation axis 3d, 4d of the rollers. Each guiding faces 9, 10 and the associated raceway 5, 6 delimit a V-shaped groove directed radially outwards.

The outer ring 2 also comprises guiding faces 11, 12 formed into the bore 2d and coming into axial contact with the end faces 3c, 4c of the rollers 3, 4 with regard to the rotation axes 3d, 4d. The guiding faces 11, 12 are mutually symmetric with respect to the radial plane passing through the centre of rolling bearing. The guiding faces 11, 12 and the guiding faces 9, 10 mutually face each other and are respectively parallel. Each guiding face 11, 12 is straight and disposed perpendicular to the corresponding raceway 7, 8 and is connected to the edge of large diameter of said raceway by a concave fillet. Each guiding face 11, 12 extends obliquely inwards from said fillet and is connected to the bore 2d of the inner ring. Each guiding face 11, 12 extend radially relative to the rotation axis 3d, 4d of the rollers. Each guiding face 11, 12 and the associated raceway 7, 8 delimit a V-shaped groove directed radially inwards.

The raceway 5 and the guiding face 9 of the inner ring define together with the raceway 7 and the guiding face 11 of the outer ring a first annular space inside which the row of rollers 3 is disposed. Each roller 3 arranged between the raceways 5, 7 are maintained laterally in position by the guiding faces 9, 11 to avoid a skewing or tilting of said rollers with respect to the raceways. Each guiding face 9, 11 form a flank having a direct contact surface with the associated end face 3b, 3c of the rollers 3 to have a slight relative sliding between the end faces 3b, 3c of rollers 3 and the inner and outer rings 1, 2. According to an analysis made by the applicant, it was found that a good compromise is obtained between the lateral guiding of the rollers 3 and the induced friction torque when the ratio of the clearance between the guiding faces 9, 11 and the end faces 3b, 3c of the rollers 3 with respect to the length of said rollers is from 0.1% to 5%, and preferably from 0.5% to 0.9%. In order to limit the friction torque between the rollers 3 and the inner and outer rings 1 and 2, the length of the guiding faces 9, 11 is smaller than the one of the raceways 5, 7.

Similarly, the raceway 6 and the guiding face 10 of the inner ring define together with the raceway 8 and the guiding face 12 of the outer ring a second annular space inside which the row of rollers 4 is disposed. The arrangement of the rollers 4 with respect to the guiding faces 10, 12 is the same that the one previously described for the rollers 3 and the guiding faces 9, 11.

The rolling bearing also comprising a plurality of spacers 13 (FIG. 3) disposed circumferentially between the rollers 3, 4 to maintain the circumferential spacing between them. The spacers 13 are identical with one another and each placed between two consecutive rollers 3, 4. The spacers 13 may be made from metal or from plastic material. Each spacer 13 comprises two opposite cavities 14, 15 having the shape of cylinder segments with parallel axes. The cavities 14, 15 have a concave profile which corresponds to the profile of the rolling surface 3a, 4a of the rollers 3, 4. The axial length of the cavities 14, 15 is slightly smaller than the length of the rollers 3, 4. The cavities 14, 15 are delimited axially by opposite lateral surfaces 16, 17 which face the corresponding guiding faces of the rings 1, 2. The spacer 13 also comprises two opposite planar surfaces 18, 19 facing the corresponding raceways of said rings.

Each spacer 13 comprises a through-hole 20 made inside its thickness, which opens onto the cavities 14, 15 and put said cavities into communication. A lubricant (not shown) is disposed inside the through-hole 20, said hole acting as lubricant reservoir for lubricating the rolling surfaces 3a, 4a of the rollers. The lubricant used may be grease or oil. The through-hole 20 allows the lubricant contained to emerge directly onto the rolling surface 3a, 4a of each roller 3, 4.

As shown on FIG. 1, the inner and outer rings 1, 2 further respectively comprise axial holes 21, 22 for fixing the two rings to two parts of a machine which can rotate one with respect to the other by virtue of the rolling bearing.

The outer ring 2 also comprises a filling orifice 23 (FIG. 2) which extends radially from the outer cylindrical surface 2a and opens into the annular space delimited by the raceways 5, 7 and the guiding faces 9, 11 of the inner and outer rings. A plug 24 closes the filling orifice 23 and is held in place relative to the outer ring 2 by a pin 25 which extends axially. The plug 24 comprises two planar surfaces 24a, 24b having respectively the same shape than the raceway 7 and the guiding face 11. Said raceway 7 and guiding face 11 are interrupted by the filling orifice and are replaced at this level by the planar surfaces 24a, 24b of the plug without the mechanical properties thereof being impaired. The filling orifice 23 is provided in the outer ring 2 for introducing the rollers 3 and the spacers 13 into the first annular space defined between the inner and outer rings 1, 2.

The outer ring 2 also comprises a second filling orifice 26 which extends radially from the outer cylindrical surface 2a and opens into the annular space delimited by the raceways 6, 8 and the guiding faces 10, 12. The outer ring 2 also comprises a plug 27 closing the filling orifice 26 and comprising two planar surfaces 27a, 27b which respectively replace locally the raceway 8 and the guiding face 12. The plug 27 is held in place by a pin 28. The filling orifice 26 enables the introduction of the rollers 4 and the spacers 13 into the second annular space defined between the inner and outer rings 1, 2. In the illustrated embodiment, the plugs 24, 27 are provided on the outer ring 2. Alternatively, the plugs may be provided on the inner ring 1.

The embodiment shown on FIG. 4, in which identical parts are given identical references, differs from the previous embodiment in that the rolling bearing further comprising two annular seals 31, 32 positioned radially between the inner and outer rings 1, 2. The seal 31 is mounted axially between the rollers 3 and the radial surface 2b of the outer ring 2. The seal 32 is positioned axially between the rollers 4 and the radial surface 1c of the inner ring 1. The seal 32 is identical to the seal 31 and is positioned symmetrically with respect to the latter with regard to the radial plane passing through the centre of the rolling bearing. A closed space is defined between the rings 1, 2 and the seals 31, 32 in which the rollers 3, 4 are housed so as to be protected against polluting elements.

The seal 31 has, in cross section, the overall shape of a H. The seal 31 formed of an elastic material comprises an annular portion 33, two annular internal lips 34, 35 forming one of the branches of the H, and two annular external lips 36, 37 forming the other branch of said H. The lips 34 to 37 have a certain degree of axial elasticity and join or attach directly the annular portion 33. The lips 34, 35 and 36, 37 are symmetric with respect to a radial plane passing through the centre of the seal 31, the lips 34, 36 and 35, 37 being also symmetric with respect to an axial plane passing through the portion 33. The lips 34, 36 and 35, 37 respectively press against annular radial protrusions or ribs 38 and 39 respectively provided on the outer cylindrical surface 1d of the inner ring and on the bore 2d of the outer ring. The ribs 38, 39 radially face each other.

The seal 31 is axially maintained between the inner and outer rings 1, 2 by the opposite radial ribs 38, 39. In order to keep in a permanent contact state the lips 34, 36 and 35, 37 with ribs 38 and 39, the thickness of the ribs is made larger than the axial gap between the lips in a free state. The seal 31 and the ribs 38, 39 are thus resiliently coupled in the axial direction which prevents relative axial displacement between the seal 31 and the rings 1, 2.

As above-mentioned, the sealing of the rolling bearing on the other side is provided by the seal 32 which is identical to the seal 31 and which cooperates with annular ribs 40, 41 of the inner and outer rings 1, 2. Said ribs 40, 41 and 38, 39 are mutually symmetric with respect to the radial plane passing through the center of the rolling bearing.

Although the invention has been illustrated on the basis of a rolling bearing having a double row of oblique contact rollers, it should be understood that the invention can be applied to bearings having a simple row of rollers or at least three rows of rollers. Otherwise, in the illustrated embodiments, the rolling bearings are O-type bearings. Alternatively, it may also be possible to foresee X-type rolling bearings.

Furthermore, the inner ring and/or the outer ring may comprise gearing teeth on their outer periphery, so as to be connected to driving gears for instance connected to the output shaft of a motor.

Thanks to the invention, the service life of the bearing is increased by up to 40% and the friction of the bearing is reduced. This is particularly advantageous in the case of a wind turbine comprising actuation means for changing the pitch of the blades, because it allows to downsize these actuation means since less power is required to pitch the blades, and even to reduce the response time of this pitching action, with, as a consequence, an improved overall efficiency of the wind turbine.

The invention claimed is:

1. A rolling bearing comprising:
an inner ring,
an outer ring, wherein the inner and outer rings are the only two rings, and
at least one row of angular contact rollers disposed between raceways provided on the rings, each roller having a rolling surface in contact with the raceways and two opposite end faces, wherein an entire length of the rolling surface of each roller is in contact with the raceways of the inner and outer rings such that the inner and outer rings together provide only two discrete regions of contact on the rolling surface of each roller,
a plurality of spacers each disconnected from the rest of the plurality of spacers and disposed circumferentially between the rollers and configured to only contact the rollers along the rolling surface thereof, wherein
guiding faces being configured to contact the end faces of the rollers are provided on the inner ring and the outer ring depending on a load exerted on the rolling bearing, a clearance being present between the guiding faces and the end faces of the rollers with respect to the length of the rollers to allow a relative sliding between the end faces of the rollers and the inner and outer rings such that the rolling bearing is capable of operation with each roller in contact with the raceways and only one of the guiding faces, wherein a length of the guiding faces is smaller than a length of the raceways, and wherein each guiding face is connected to a corresponding one of the raceways by a fillet.

2. The rolling bearing according to claim 1, wherein a ratio of the clearance between the guiding faces and the end faces of the rollers with respect to the length of said rollers is from 0.1% to 5%.

3. The rolling bearing according to claim 2, wherein the guiding faces are formed directly on the inner ring and the outer ring.

4. The rolling bearing according to claim 2, wherein the ratio of the clearance between the guiding faces and the end faces of the rollers with respect to the length of the rollers is from 0.5% to 0.9%.

5. The rolling bearing according to claim 1, wherein the guiding faces and the raceways of the rings are disposed perpendicular with respect to one another.

6. The rolling bearing according to claim 1, wherein the rotation axes of the rollers of the same row converge in one single point located on a longitudinal center axis of the bearing.

7. The rolling bearing according to claim 1, wherein the guiding faces extend perpendicularly relative to their corresponding raceway.

8. The rolling bearing according to claim 1, wherein the guiding faces are straight.

9. The rolling bearing according to claim 1, wherein each spacer includes two parallel cavities having the shape of the rollers and at least one hole housing a lubricant and wherein the two cavities are placed into communication with each other.

10. The rolling bearing according to claim 1, further comprising seals disposed between the inner and outer rings and having in cross section the overall shape of a H, each of the seals having internal lips and external lips forming the two substantially parallel branches of the H, the inner and outer rings providing opposite radial ribs located axially between the internal and external lips of each seal.

11. The rolling bearing according to claim 1, wherein the guiding faces comprise a first guiding face on the inner ring and a second guiding face on the outer ring.

12. The rolling bearing according to claim 1, wherein the rolling surface of each of the rollers have a cylindrical profile.

13. The rolling bearing according to claim 1, further comprising plugs provided on the outer ring for closing filling orifices through which the rollers have been introduced during assembly of the bearing.

14. The rolling bearing according to claim 1, wherein the rolling bearing is used in a wind turbine having a mast holding a nacelle where blades are installed for rotating the nacelle with respect to the mast and/or for rotating/pitching each blade around its longitudinal axis.

* * * * *